(12) United States Patent
Barbu (10) Patent No.: US 8,866,936 B2
(45) Date of Patent: Oct. 21, 2014

(54) SYSTEMS AND METHODS FOR TRAINING AN ACTIVE RANDOM FIELD FOR REAL-TIME IMAGE DENOISING

(75) Inventor: Adrian Gheorghe Barbu, Tallahassee, FL (US)

(73) Assignee: Florida State University of Research Foundation, Tallahassee, FL (US)

( * ) Notice: Subject to any disclaimer, the term of this patent is extended or adjusted under 35 U.S.C. 154(b) by 1095 days.

(21) Appl. No.: 12/508,211

(22) Filed: Jul. 23, 2009

(65) Prior Publication Data

US 2010/0020208 A1    Jan. 28, 2010

Related U.S. Application Data

(60) Provisional application No. 61/083,382, filed on Jul. 24, 2008.

(51) Int. Cl.

| | |
|---|---|
| *H04N 5/217* | (2011.01) |
| *H04N 9/64* | (2006.01) |
| *H04N 5/21* | (2006.01) |
| *G06K 9/62* | (2006.01) |
| *G06T 5/00* | (2006.01) |
| *G06K 9/40* | (2006.01) |
| *H04N 5/357* | (2011.01) |
| *G06T 5/20* | (2006.01) |

(52) U.S. Cl.
CPC ........ *H04N 5/21* (2013.01); *G06T 2207/20081* (2013.01); *G06K 9/6297* (2013.01); *G06T 5/002* (2013.01); *G06T 2207/20076* (2013.01); *G06K 9/40* (2013.01); *H04N 5/357* (2013.01); *G06T 5/20* (2013.01)
USPC ............................ 348/241; 348/250; 348/251

(58) Field of Classification Search
USPC ......... 382/282, 254, 255, 260–266, 268, 269, 382/274–275; 348/246, 251, 255, 221.1, 348/222.1, 250, 241, 248, 249, 294
See application file for complete search history.

(56) References Cited

U.S. PATENT DOCUMENTS

| | | | | |
|---|---|---|---|---|
| 5,396,310 | A * | 3/1995 | Fujiyama | 396/168 |
| 6,819,804 | B2 * | 11/2004 | Tenze et al. | 382/262 |
| 7,369,165 | B2 * | 5/2008 | Bosco et al. | 348/272 |
| 7,463,304 | B2 * | 12/2008 | Murray | 348/371 |
| 7,792,381 | B2 * | 9/2010 | Rhee | 382/260 |
| 8,094,344 | B2 * | 1/2012 | Cattrone et al. | 358/3.26 |
| 2003/0048368 | A1 * | 3/2003 | Bosco et al. | 348/272 |
| 2006/0158562 | A1 * | 7/2006 | Rhee | 348/607 |

OTHER PUBLICATIONS

Altun, Y. and Tsochantaridis, I. and Hofmann, T. Hidden Markov Support Vector Machines. *International Conference in Machine Learning*, 20(1):3, 2003.
Barbu, A. Learning Real-Time MRF Inference for Image Denoising. *IEEE Conference on Computer Vision and Pattern Recognition*, 2009.
Besag, J. On the statistical analysis of dirty pictures. *Journal of the Royal Statistical Society B*, 48(3):259-302, 1986.

(Continued)

*Primary Examiner* — Ahmed A Berhan
(74) *Attorney, Agent, or Firm* — Sutherland Asbill & Brennan LLP (57) ABSTRACT

An Active Random Field is presented, in which a Markov Random Field (MRF) or a Conditional Random Field (CRF) is trained together with a fast inference algorithm using pairs of input and desired output and a benchmark error measure.

20 Claims, 8 Drawing Sheets

(56) References Cited

OTHER PUBLICATIONS

Boykov, Y. and Veksler, O. and Zabih, R. Fast approximate energy minimization via graph cuts. *Pattern Analysis and Machine Intelligence, IEEE Transactions on*, 23(11):1222-1239, 2001.

Buades, A. and Coll, B. and Morel, J.M. A Non-Local Algorithm for Image Denoising. *Computer Vision and Pattern Recognition, 2005. CVPR 2005. IEEE Computer Society Conference on*, 2, 2005.

Cootes, T.F. and Edwards, G.J. and Taylor, C.J. Active appearance models. *IEEE Transactions on Pattern Analysis and Machine Intelligence*, 23(6):681-685, 2001.

Dabov, K. and Foi, A. and Katkovnik, V. and Egiazarian, K. Image Denoising by Sparse 3-D Transform-Domain Collaborative Filtering. *Image Processing, IEEE Transactions on*, 16(8):2080-2095, 2007.

Elad, M. and Aharon, M. Image denoising via sparse and redundant representations over learned dictionaries. *IEEE Trans. Image Process*, 15(12):3736-3745, 2006.

Hinton, G.E. Training Products of Experts by Minimizing Contrastive Divergence. *Neural Computation*, 14(8):1771-1800, 2002.

Jain, V. and Seung, H. Sebastian Natural Image Denoising with Convolutional Networks. *Brain & Cognitive Sciences, Massachusetts Inst. of Technology; Howard Hughes Medical Institute; Massachusetts Inst. of Technology*.

Kumar, S. and Hebert, M. Discriminative random fields: a discriminative framework for contextual interaction in classification. *Computer Vision, 2003. Proceedings. Ninth IEEE International Conference on*, :1150-1157, 2003.

Lafferty, J.D. and McCallum, A. and Pereira, F.C.N. Conditional Random Fields: Probabilistic Models for Segmenting and Labeling Sequence Data. *Proceedings of the Eighteenth International Conference on Machine Learning table of contents*, :282-289, 2001.

LeCun, Y. and Huang, F.J. Loss functions for discriminative training of energy-based models. *Proc. of the 10-th International Workshop on Artificial Intelligence and Statistics (AIStats' 05)*, 3, 2005.

Martin, D. and Fowlkes, C. and Tal, D. and Malik, J. A Database of Human Segmented Natural Images and its Application to Evaluating Segmentation Algorithms. *Proc. of ICCV01*, 2:416-425.

Pizurica, A. and Philips, W. Estimating the Probability of the Presence of a Signal of Interest in Multiresolution Single-and Multiband Image Denoising. *Image Processing, IEEE Transactions on*, 15(3):654-665, 2006.

Portilla, J. and Strela, V. and Wainwright, MJ and Simoncelli, EP. Image denoising using scale mixtures of Gaussians in the wavelet domain. *Image Processing, IEEE Transactions on*, 12(11):1338-1351, 2003.

Roth, S. and Black, M.J. Fields of Experts. *International Journal of Computer Vision*, 82(2):205-229, 2009.

Roth, S. and Black, M.J. Fields of Experts. *International Journal of Computer Vision*, Preprint—DOI 10.1007/s11263-008-0197-6.

Sun, J. and Zheng, N.N. and Shum, H.Y. Stereo matching using belief propagation. *IEEE Transactions on Pattern Analysis and Machine Intelligence*, 25(7):787-800, 2003.

Sun, J. and Zheng, N.N. and Shum, H.Y. Stereo matching using belief propagation. *Artificial Intelligence and Robotics Lab, Xi'an Jiaotong University, China; Visual Computing Group, Microsoft Research Asia*, Beijing.

Tappen, M.F. and Orlando, FL. Utilizing Variational Optimization to Learn Markov Random Fields. *Computer Vision and Pattern Recognition, 2007. CVPR'07. IEEE Conference on*, :1-8, 2007.

Tappen, MF and Freeman, WT. Comparison of graph cuts with belief propagation for stereo, using identical MRF parameters. *ICCV*, :900-906, 2003.

Taskar, B. and Lacoste-Julien, S. and Jordan, M. Structured Prediction via the Extragradient Method. *Advances in Neural Information Processing Systems (NIPS)*, 18:1345, 2006.

Turney, P.D. Cost-sensitive classification: Empirical evaluation of a hybrid genetic decision tree induction algorithm. *Journal of Artificial Intelligence Research*, 2(1995):369-409, 1995.

M. J. Wainwright. Estimating the "Wrong" Graphical Model: Benefits in the Computation-Limited Setting. *J. Mach. Learn. Res.*, 7:1829-1859, 2006.

Xu, L. and Hutter, F. and Hoos, H.H. and Leyton-Brown, K. SATzilla: Portfolio-based Algorithm Selection for SAT. *Journal of Artificial Intelligence Research*, 32:565-606, 2008.

Yedidia, J.S. and Freeman, W.T. and Weiss, Y. Generalized belief propagation. *Advances in Neural Information Processing Systems*, 13:689-695, 2001.

Y. Zheng and A. Barbu and B. Georgescu and M. Scheuering and D. Comaniciu. Four-Chamber Heart Modeling and Automatic Segmentation for 3-D Cardiac CT Volumes Using Marginal Space Learning and Steerable Features. *Medical Imaging, IEEE Transactions on*, 27(11):1668-1681, 2008.

Zhou, S.K. and Comaniciu, D. Shape Regression Machine. *Proceedings of Information Processing in Medical Imaging*, :13-25, 2007.

\* cited by examiner

SYSTEMS AND METHODS FOR TRAINING AN ACTIVE RANDOM FIELD FOR REAL-TIME IMAGE DENOISING

CROSS-REFERENCE TO RELATED APPLICATION

This application claims the benefit of U.S. Provisional Application No. 61/083,382, filed Jul. 24, 2008, which is incorporated herein by reference in its entirety.

FIELD OF INVENTION

The invention generally relates to computer vision optimization, and more specifically towards rapid image denoising.

BACKGROUND

Digital images often contain unwanted noise that can degrade the quality of the image. Researchers have experimented with a substantial number of model/algorithm combinations in an attempt to find combinations that can effectively remove the noise from the images while being computationally efficient. What follows is a brief description of some of the example models and algorithms that have been employed thus far in removing noise from images.

Active Appearance Models are iterative algorithms driven by data and a Principal Component Analysis-like model to find objects of interest in the image. The solution depends on the starting location, so these models are usually used in cooperation with other algorithms or with user initialization. A more complete solution for object or shape detection is offered by the Shape Regression Machine, where an image based regression algorithm is trained to find a vector toward the object of interest from any random location inside the image. Fast and robust object detection is obtained by using hundreds of random initializations and a verification step based on Adaptive Boosting. The Shape Regression Machine can thus be seen as a trained model–algorithm combination for object or shape detection.

Energy based models have also been evaluated for noise removal methods. These models are trained in such a way that the minimum energy is at the desired location on the training set, independent of the optimization (inference) algorithm that is used, and therefore, specific conditions on the energy function are imposed. Other model–algorithm combinations exist where the model can be learned without imposing any computational complexity constraints. One combination in this category is a Conditional Random Fields (CRF), which is based on pair-wise potentials trained for object classification using boosting and a pixel-wise loss function. Each classifier is based on features from the data and on recursive probability map information. Such methods train Markov Random Field (MRF) model–algorithm combinations that slowly decrease in speed at each training iteration, because the models become more and more complex.

A loss function can be used to evaluate and train model/algorithm combinations; however, previous methods using the loss function employ computationally intensive inference algorithms that are focused on exact Maximum A Posteriori (MAP) estimation for obtaining a strong MRF optimum.

Many real-world digital imaging or computer vision problems can be regarded as graph-based optimization problems, where the pixels are smaller granularities of the image. In some systems employing graph-based optimization (e.g. material science), there exists a unique energy function that can be described mathematically and can accurately represent the relationship between the graph nodes. In image analysis, however, there is usually no known mathematical model that is computationally feasible and can accurately represent the underlying phenomenon. Nevertheless, one can typically find measures to quantitatively evaluate the performance of any algorithm that attempts to solve the graph-based optimization problem. In general, these problems are solved by constructing a model as an energy function such that the task goal is a minimum of this function, and by employing a graph-based optimization algorithm to find this minimum. This approach faces at least the following two challenges. First, the energy function should be computationally feasible in the sense that the minimum should be found in polynomial time. This does not usually happen in reality, since finding the global minimum for many energy functions associated with real-world applications is nondeterministic polynomial-time hard (NP hard) therefore polynomial-time algorithms are not expected to be found.

SUMMARY OF THE INVENTION

Embodiments of the invention can include systems and methods for providing image optimization. In marked contrast to traditional methods utilizing an independent learning process for the model and algorithm, certain system and method embodiments of the invention can utilize a combined training of the model and algorithm that results in an increase in overall system accuracy and computational performance.

According to an example embodiment of the invention, an inference algorithm is chosen for speed over accuracy, and may be describe as suboptimal in that it does not try to obtain a strong optimum. Therefore according to example embodiments, it is more important to prevent overfitting than to obtain a strong MRF optimum.

According to example embodiments of the invention, an Active Random Field (ARF) model may be employed for image denoising. The ARF model resembles energy based models in that only the energy part of the MRF is used without a normalization constant, and a loss function is used for training. The ARF training may find the model parameters that give the best results on a training set using a preselected inference algorithm. As a consequence, conditions on the energy function or the loss function do not need to be imposed on the ARF. The applicability of the ARF herein is only limited by the existence of a fast inference algorithm that can obtain results in a matter of seconds, since it will have to be applied many times during training.

According to example embodiments of the invention, the MRF/CRF model is learned independently of the associated inference algorithm used to obtain the final result. Consequently, the number of processing steps and time required to optimize the model and algorithm may be significant, and in many cases, too computationally complex for real-time processes. However, even when using a fast inference algorithm such as one iteration of gradient descent, through appropriate training and with a complex and flexible enough model, the model will adapt to the simple descent algorithm. Consequently, the image denoising results achieved herein surpass any previous results based on MRF models in both speed and accuracy.

According to an example embodiment of the invention, an ARF may be defined as a combination of a MRF/CRF-based model and a fast inference algorithm. This combination may be trained through an optimization procedure on a benchmark measure using training pairs of input images and a corresponding desired output image. Considerable benefits are obtained from such a joint approach in an image denoising application, using the Fields of Experts (FOE) MRF together with a fast inference algorithm. Experimental validation on unseen data shows that the ARF approach obtains a much better benchmark performance as well as a 1000-3000 times speed improvement compared to the FOE for image denoising. Consequently, image denoising can be performed in real-time, at 8 frames-per-second on a single CPU for a 256×256 image sequence, with close to state-of-the-art accuracy.

DETAILED DESCRIPTION OF EMBODIMENTS

Embodiments of the invention will now be described more fully hereinafter with reference to the accompanying drawings. This invention may, however, be embodied in many different forms and should not be construed as limited to the embodiment set forth herein; rather, embodiments are provided so that this disclosure will be thorough and complete, and will convey the scope of the invention.

Embodiments of the invention can include systems and methods for providing graph-based optimization to problems in which the energy model and the optimization algorithm, as two parts of a whole, and their parameters may be learned so that these two parts work best together. The Markov Random Field (MRF) model may be used with an inference algorithm for image denoising. A method in accordance with an embodiment of the invention restricts the algorithm to be 1000-3000 times faster, and the best model–algorithm parameters are found by using a training dataset. On standard benchmark images that were not used for training, the trained model–algorithm combination obtains improved denoising performance compared to the equivalent MRF model while being thousands of times faster.

Jointly Training the Model and the Algorithm

Markov Random Fields are used extensively in many areas of computer vision, signal processing and beyond. They are capable enforcing strong regularization on the desired results. Beginning with a graph G=(V,E), with nodes V and edges E, a set of random variables $x=(x_v)_v \in V$ representing hidden attributes (e.g. labels) of the nodes $v \in V$, and a set C of cliques (fully connected subgraphs) of G. In a Bayesian framework, the posterior probability of the hidden variables x given input data (image, signal) y is $$P(x|y) \propto P(y|x)P(x) \quad (1)$$

The MRF (C,ϕ) models the prior on the hidden variables x $$P(x) = \frac{1}{Z} \exp\left[\sum_{o \in C} \phi_o(x_o)\right] \quad (2)$$

where $\phi_c(x_c)$ are potential functions that enforce the regularization between the variables $(x_c)$ corresponding to the clique c, and Z is a normalization constant. The cliques can be as small as graph edges (order 2), but larger cliques are preferred since they are capable of representing more complex relationships. According to an example denoising embodiment of the invention, the graph G can be the pixel lattice and the cliques can contain 25 nodes, namely all the 5×5 pixel patches of the image.

Conditional Random Fields (CRF) were developed as an extension of the MRF so that the clique potentials depend on the input data (image or signal) y. A CRF is also a pair (C,ϕ) with the ϕ depending on y.

$$P(x|y) = \frac{1}{Z(y)} \exp\left[\sum_{o \in C} \phi_o(x_o, y)\right] \quad (3)$$

The MRFs and CRFs have at least the following advantage: They are capable of encoding complex relationships between the graph attributes x resulting in flexible yet powerful models. However, the MRFs and CRFs may also have some of the following disadvantages:

(1) Inferring the optimal state is computationally demanding. For example, exact inference even for one of the simplest pair-wise MRF priors such as the Potts model is NP hard. Hence, approximate solutions are usually sought and used in practice.

(2) Training the MRF is difficult, since comparing different MRF models requires the knowledge of the normalization constant Z. Moreover, the obtained MRF or CRF (together with a data factor) is usually just an approximation of the true posterior probability.

(3) The MRF/CRF is trained independently of the inference algorithm. If the MRF/CRF is trained together with the inference algorithm, significant gains in both speed and accuracy can be obtained.

Figure 1:
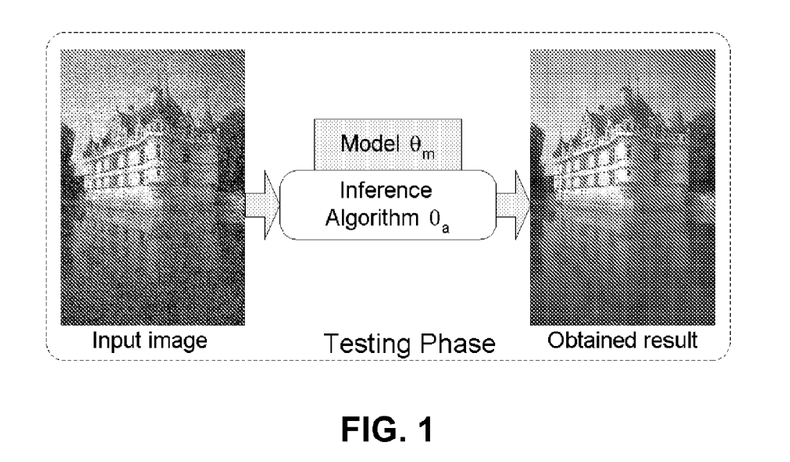
FIG. 1 is an example of using the Markov Random Field (MRF) model, and the use of an inference algorithm to denoise an image, according to an example embodiment of the invention.

According to example embodiments of the invention, the MRF/CRF may be used with an inference algorithm, as shown in FIG. 1. By training the MRF/CRF together with the inference algorithm, significant improvements in both speed and accuracy can be obtained.

Figure 2:
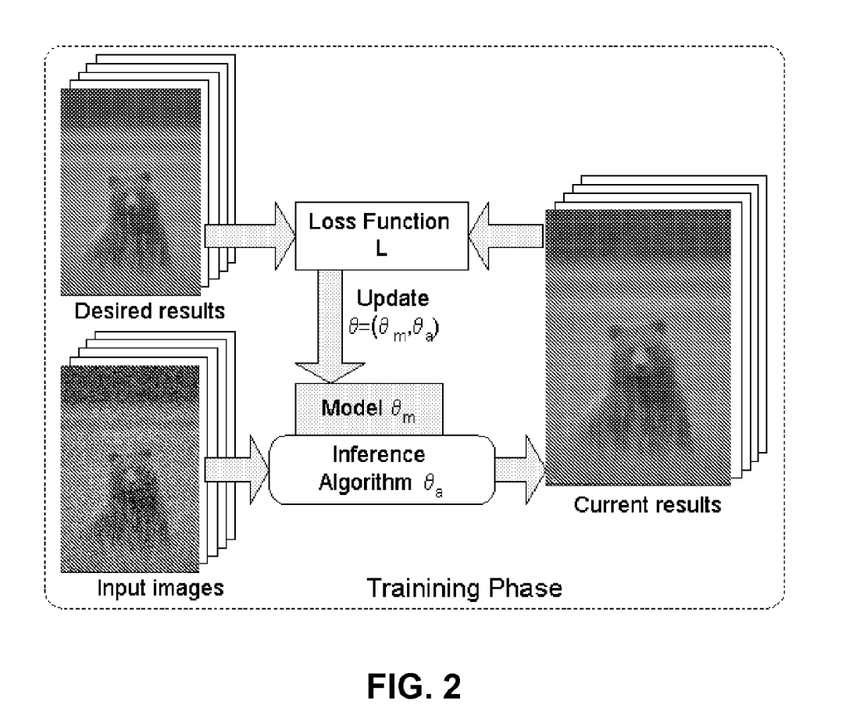
FIG. 2 is an example training, according to an example embodiment of the invention.
Figure 5:
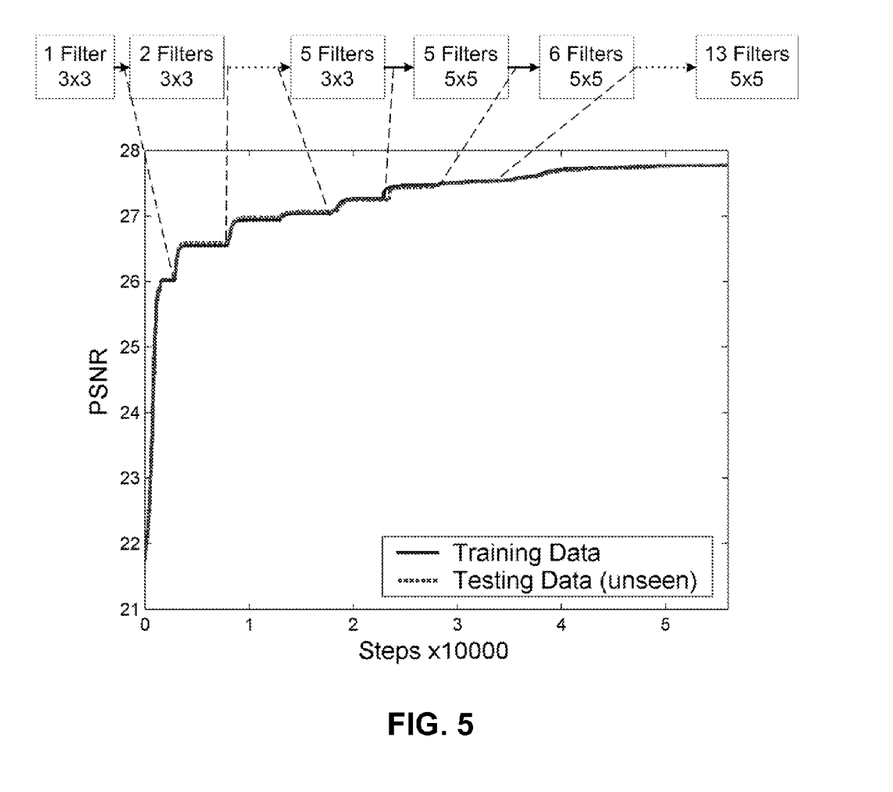
FIG. 5 is an example of signal to noise evolution on the training and test set, according to an example embodiment of the invention.

According to example embodiments of the invention, the training can be supervised and can utilize 13 filters. The preferred method is to start with one iteration using five filters, then gradually add filters one by one, starting from the one iteration filters, then train two iterations; then start from two iteration filters and train three iterations. However, according to other example embodiments of the invention, between one and four, and six or more filters could also be used for training. Results can be continuously monitored, as illustrated in FIG. 5, and training can terminate upon predetermined metrics of improvement, or other metrics, such as number of iterations. FIG. 5 shows example PSNR evolution observed while training the one iteration ($n_{iter}=1$) ARF parameters for the level of noise $\sigma=25$, according to an example embodiment of the invention. Also displayed in dotted lines are the training and testing PSNR of a GMRF with the same model complexity. Since most fast inference algorithms obtain a sub-optimal solution anyway, a different approach is proposed in which the model parameters are trained such that the inference algorithm output (and not the "ideal" MAP estimate as in the Energy Based Models) is close to the desired output. This way, the suboptimal inference algorithm is involved in the parameter learning phase.

$$\min_\theta \sum_i L(x_i, t_i), \text{ with } x_i = A(y_i, \theta) \qquad (4)$$

where $x=A(y,\theta)$ is the result of the algorithm A with the model and algorithm parameters $\theta=(\theta_m,\theta_a)$ on the input image y. As with the Energy Based Models, the training data consists of pairs $(y_i,t_i)$ consisting of input images $y_i$ and the corresponding desired outputs $t_i$. This approach is illustrated in FIG. 2, where the Active Random Field (ARF) is a MRF/CRF model trained together with a fast inference algorithm using pairs of input and desired output as training examples. Training may be achieved by optimizing a loss function that evaluates how well the given model+algorithm combination denoises an image.

Active Random Field

An embodiment of the invention utilizes the MRF/CRF type of model as a skeleton and aims at training the model and the algorithm together. An Active Random Field (ARF) (C, ϕ, A) is a MRF or CRF (C, ϕ) trained together with an inference algorithm A∈A. The algorithm A was selected from a family of algorithms A to provide inference on the input data I using the model (C, ϕ).

According to example embodiments of the invention, the algorithm family A can include any type of algorithm that has been previously used for MRF/CRF inference: gradient descent, Belief Propagation, Graph Cuts, etc.; however, in contrast to the standard MRF/CRF approaches, the algorithms in the family A are restricted to be very fast, by sacrificing accuracy. For example, the number of gradient descent iterations in our image denoising application is kept very small, on the order of one to four as opposed to 3,000 to 10,000 iterations required in previous systems. The deficit in accuracy of the algorithm may be compensated by training the model to give best results on this algorithm, resulting in a fast and accurate combination.

According to an example embodiment of the invention, the performance of the ARF is measured using a loss function L that is a generally accepted benchmark. In image denoising, and according to an embodiment of the average PSNR (peak signal-to-noise ratio) over the set of images (training or testing) and replace the minimization in Equation (4) with a maximization.

The differences from the standard MRF/CRF approaches and the ARF example approaches that are in accordance with the invention include:

1. The normalization constant Z is not important in the ARF since different models are compared using the loss function L instead of the likelihood or posterior probability.
2. The training set consists of pairs of input images and desired results. With the loss functions, this avoids the need for sampling from the learned distribution as in the MRF/CRF training. The new training approach gives a better idea on when the training is completed or whether overfitting occurs.
3. The trained model and algorithm complement each other and result in a fast and accurate system.
4. The MRF/CRF are just models that are always used with the help of an inference algorithm. On the other hand, the ARF is a trained model-plus-algorithm combination that given an input, returns a result, thus it is a full computational solution.

Training the Active Random Field

Training of the ARF is achieved using examples in the form of pairs $(y_i, t_i)$ of the observed images $y_i$ and the corresponding desired outputs $t_i$. Given a training set $T=\{(y_i, t_i), I=1, \ldots, n\}$ consisting of such pairs, the loss function $L(y, t)$ is used to evaluate how well the model and algorithm solve the given problem on this training set. If the model–algorithm combination is parameterized by $\theta=(\theta_m, \theta_a)$, the training is an optimization procedure to find $$\theta = \operatorname*{argmin}_\theta \sum_{i=1}^n L(A(y_i, \theta), t_i) \qquad (5)$$

Depending on the problem, different optimization algorithms (coordinate descent, conjugate gradient, simulated annealing, genetic algorithm, etc) could be appropriate.

There are at least two considerations regarding this ARF approach:

1. One concern is over-fitting the training data, this happens when an increased performance on the training data is reflected in a decreased performance on an unseen dataset. Overfitting can be detected using a validation set and appropriate measures can be taken. Possible measures may include increasing the number of training examples or changing the type of the training examples (e.g., larger images to avoid boundary effects).
2. Another concern is the computational complexity of applying the algorithm on all the training examples for each optimization iteration. This concern may be addressed in three ways. First, different design strategies (for example, temporarily storing partial results) can be used to reduce the computation to a fraction of the full evaluation cost. Second, one can use efficient optimization algorithms such as conjugate gradient or genetic algorithms to make good use of each function evaluation. Third, the computational demand is less of an issue every day due to the exponential growth in computational power of a standard PC. Even though the CPU frequency has reached a limit recently, the number of CPU cores in a standard PC still increases exponentially. Furthermore, the training can be easily parallelized, resulting in a good utilization of all available computing power.

Image Denoising

When an embodiment, e.g., ARF, as described above, is applied to image denoising, where given an image corrupted with noise, one desires to obtain an image from which the noise was removed. Image Denoising can be viewed as a graph-based optimization problem, with the graph nodes being the pixels of the image. This problem has been addressed using wavelets, and by learning a MRF prior model named Fields of Experts on 5×5 pixel cliques. Non-local image denoising methods and 3D collaborative filtering (BM3D) may be utilized to obtain very good results with low computational expense.

Figure 3:
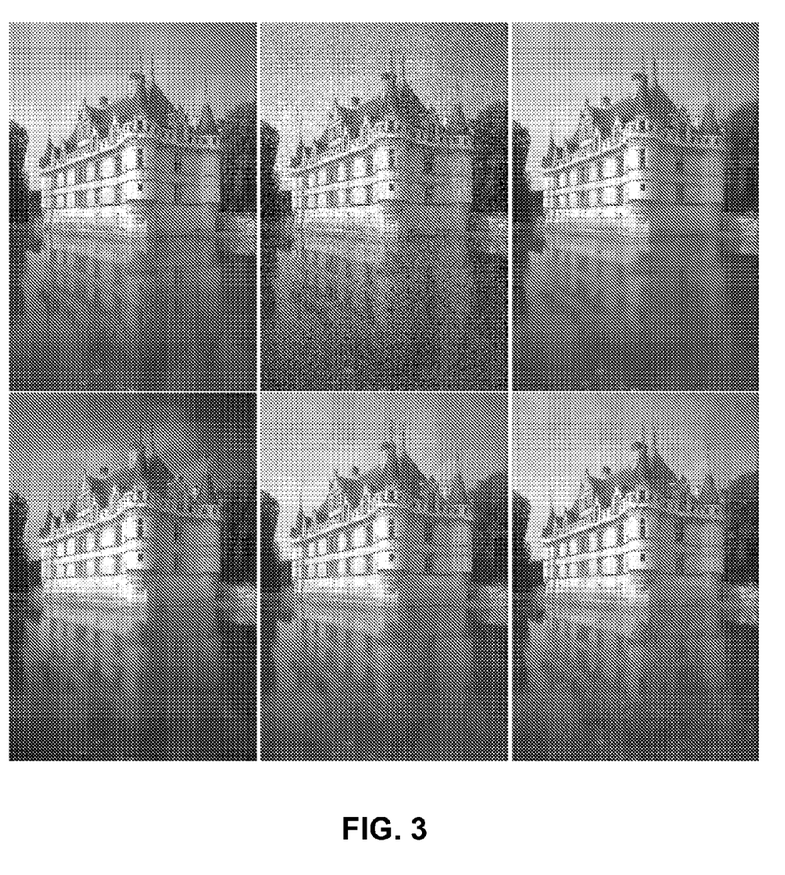
FIG. 3 is an example of image denoising, according to an example embodiment of the invention.

An example of an image denoising problem and results obtained using the above mentioned methods as well as the ARF approach proposed in this paper are shown in FIG. 3 together with the CPU time required to obtain each result.

Another approach uses a sparse representation based on a learned dictionary of primitives and is more computationally expensive. The images depicted in FIG. 3 are as follows: Top (from left to right): original image, image corrupted with additive Gaussian noise with σ=25, PSNR=20.17 and Fields of Experts result, PSNR=28.67, 2280 seconds. Bottom, (from left to right): wavelet denoising result, PSNR=29.05, 16 seconds, BM3D result, PSNR=29.60, 4.3 seconds and results obtained using an embodiment of the invention, PSNR=28.94, 0.6 seconds.

The ARF approach of the invention utilizes the FOE MRF model and a gradient descent algorithm, and will be briefly mentioned in the next section. The loss function used for training the ARF may be the average PSNR (Peak Signal to Noise Ratio) over the training set.

Fields of Experts

The Fields of Experts is a MRF prior model with potential functions based on a collection of convolution kernels, where $J_f$, f=1, . . . , N and coefficients $\alpha_f$, f=1, . . . , N $$p_{FOE}(x, \theta) = \frac{1}{Z(\theta)} \exp(-E_{FOE}(x, \theta)), \quad (6)$$

$$E_{FOE}(x, \theta) = \sum_k \sum_{f=1}^N \alpha_j \log\left(1 + \frac{1}{2}(J_f^T x^{(k)})^2\right)$$

The first sum is taken over the cliques k of the denoised image x, and $x_{(k)}$ are the pixels of x corresponding to clique k. There is a clique centered at each pixel location inside the image. Basically, each expert is a convolution followed by a robust potential function. For image denoising, this prior model is used together with a likelihood that assumes independent identically distributed (i.i.d.) Gaussian noise:

$$p(y \mid x) \propto \exp(-E_{data}(x \mid y)), \; E_{data}(x \mid y) = \frac{1}{2\sigma^2} \sum_j (y^f - x^f)^2 \quad (7)$$

where $x^j$ is the value of pixel j of image x. The beauty of the Fields of Experts formulation is that there is an analytical solution for the gradient of the energy with respect to x.

$$\nabla_x E_{FOE}(x, \theta) = \sum_{f=1}^N \alpha_f J_f^- * \frac{J_f^T x}{1 + \frac{1}{2}(J_f^T x)^2} \quad (8)$$

$$\nabla_x E_{data}(x \mid y) = \frac{1}{2\sigma^2}(x - y)$$

Given a noisy image and learned parameters, the denoising is obtained by gradient descent in the energy $E_{data}(x|y)+E_{FOE}(x,\theta)$, where $J_f^-$ is the mirror image of filter $J_f$ around its center pixel. Thus, by taking small steps in the direction of the gradient, a denoising result is obtained in about 3000 iterations.

Active Random Field Approach

In the Fields of Experts formulation, the model (MRF prior+likelihood) is trained independently from the MAP inference algorithm (gradient descent) and because of this separation, the convergence to the solution is very slow.

According to an embodiment of the invention, for image denoising with the ARF approach, the model and family of algorithms A is borrowed from the Fields of Experts formulation presented above. By ignoring the normalization constant from the gradient equation (8) above, the following iterative gradient descent inference algorithm that is used for MAP estimation is obtained:

$$x \leftarrow x + \delta\left[\frac{\beta}{2\sigma^2}(x - y) + \sum_{f=1}^N \alpha_f J_f^- * \frac{J_f^T x}{1 + \frac{1}{2}(J_f^T x)^2}\right] \quad (9)$$

These iterative algorithms from equation (9) form an algorithm family A, parameterized by N convolution kernel $J_f$, f=1, . . . , N with corresponding coefficients $\alpha_f$, the data coefficient β, the number $n_{iter}$ of gradient update iterations, and the update parameter δ. Therefore $$\theta = (\theta_m, \theta_a) = (N, J_1, \alpha_1, \ldots, J_N, \alpha_N, \beta, n_{iter}, \delta). \quad (10)$$

When training for a particular noise level σ, a very modest contribution of at most 0.01 dB of the data term $$\frac{\beta}{2\sigma^2}(x - y)$$

is observed to contribute to the final result.

In our approach, instead of taking $n_{iter}$=3000 iterations with small steps (δ=0.2) as in the FOE model, the algorithms in the family A have a small number of iterations $n_{iter} \in \{1, 2, 3, 4\}$ with $\delta=400/n_{iter}$. Since the number of iteration is small, the result is obtained between 800 and 3000 times faster than the FOE. At the same time it is observed that the denoising performance may actually increase compared to FOE for an appropriately trained system.

Training the Active Fields of Experts

In an illustrative embodiment of the invention, the steps for training the ARF may include:
(1) Take a Markov Random Field (MRF);
(2) Take an inference algorithm on the MRF;
(3) If given a choice among algorithms, choose the faster algorithm, even if it is approximate;
(4) Key on training data as pairs input minus desired output;
(5) Train by finding the best MRF and algorithm parameters based on the training data.

The details of the steps are further described in the following paragraphs.

The Fields of Experts model may be trained using Contrastive Divergence and Markov Chain Monte Carlo sampling. The procedure may involve gradient descent in the parameter space to minimize the Kullback-Leibler divergence between the model probability and the empirical prior probability obtained from the training examples. The parameters may be updated based on expected values with respect to the current probability distribution, values obtained using MCMC sampling. The training procedure is computationally intensive, yielding a generic prior model for natural images.

In the ARF approach, the purpose is to learn a system that is specifically tuned for the given problem, in this case image denoising. For training, images from the Berkeley dataset may be used. The training examples may consist of the 40 pairs $(y_i, t_i)$ of input images $y_i$ and desired results $t_i$, i=1, . . . , 40. The desired results $t_i$ are the original noise-free training images. The input images $y_i$ are the original training images $t_i$ corrupted with Gaussian noise of similar variance as expected at testing time. Since each training example contains 150,000 cliques, the training set contains 6,000,000 cliques. Experiments with smaller patches (e.g. of size 1.5×15) indicates that overfitting occurs when the patches are smaller than 250×250 pixels. It is suspected that overfitting is due to the boundary effect, since the graph nodes close to the patch boundary don't have all the neighbors to communicate with and behave differently than the interior nodes. The ARF learning may be achieved by optimizing the same criterion that is used for evaluating the denoising system performance, namely the average PSNR over the images in the set. Thus the loss function (peak signal-to-noise ratio (PSNR)) can be defined as $$L(x,t) = 20 \log_{10}(255/\text{std}(t-x)) \tag{11}$$

where std(t–x) is the standard deviation of the difference between the original image t and the denoised image x. For a set of images, the average loss function, or PSNR, can be used as the benchmark measure for evaluating the denoising ability of the system. Thus, learning is an optimization on the parameters θ to maximize M(θ), $$M(\theta) = \frac{1}{n}\sum_{i=1}^{n} L(A(y_i, \theta), t_i), \tag{12}$$

the average PSNR obtained after running the denoising algorithm $A(y_i,\theta)$ with parameters θ on the 40 training examples $y_i$.

In the preliminary examination of this idea, coordinate ascent was used for maximizing the loss function but other optimization methods such as simulated annealing or genetic algorithms could be more appropriate. The invention is not limited only to optimization methods that are mentioned herein, but can encompass any number of optimization strategies. In this work, coordinate ascent was used for maximizing the loss function. Coordinate ascent is a greedy iterative optimization algorithm in which at each step, one of the variables $\theta_i$ of the current state θ is chosen at random and its value is modified by a small amount (0.0001 to 0.001) if M(θ) does not decrease. If the M(θ) decreases, the variable $\theta_i$ is rolled back to its old value. Each filter is constrained to have a zero-sum so the coordinate ascent is modified so that when a filter is selected to be modified, two locations inside the filter are chosen randomly and modified by the same small amount, but with opposite signs. This way the filters always remain zero-sum.

In one embodiment of the invention, coordinate ascent was used for maximizing the loss function. Coordinate ascent is a greedy iterative optimization algorithm in which at each step, one of the variables $\theta_i$ of the current state θ is chosen at random and its value is modified by a small amount (0.0001 to 0.001) if M(θ) does not decrease. If the M(θ) decreases, the variable $\theta_i$ is rolled back to its old value.

According to an example embodiment of the invention, each filter may be constrained to have a zero-sum, and the coordinate ascent may be modified so that when a filter is selected to be modified, two locations inside the filter are chosen randomly and modified by the same small amount, but with opposite signs. This way the filters always remain zero-sum.

According to other example embodiments of the invention, optimization may be achieved with gradient ascent, conjugate gradient and the simplex methods, however, it is observed that these other methods could not find such a strong optimum as the coordinate ascent, probably because the optimum path is very narrow and a fast algorithm could not follow it properly.

In the preliminary examination of this invention, coordinate ascent was used for maximizing the loss function, but other optimization methods such as simulated annealing or genetic algorithms could be more appropriate. The invention is not limited only to optimization methods that are mentioned herein, but can encompass any number of optimization strategies.

According to an example embodiment of the invention, one-iteration parameters may be trained first, for a level of noise σ=25. For the one-iteration parameters, the coefficients $\alpha_f$ can be well approximated analytically as the solution of the least squares problem:

$$\sum_{i=1}^{40}\left\|t_i - x_i - \delta\sum_{f=1}^{N}\alpha_f g_f^i\right\|^2, \text{ where} \tag{13}$$

$$(g_f^i)^f = J_f^- * \frac{J_f^T x_i^{(f)}}{1 + \frac{1}{2}(J_f^T x_i^{(f)})^2} \tag{14}$$

This leaves only the value of the filters $F_f$, f=1, . . . , N for optimization. At each step of the optimization, the coefficients α=f are obtained by solving the above least squares problem and then M(θ) is evaluated. This technique is known as Rao-Blackweillzation.

Since the function M(θ) is not convex, the optimization is prone to be stuck in local maxima. To alleviate this problem, the one iteration filters for σ=25 are trained using a simplified version of Marginal Space Learning. Marginal Space Learning is an optimization procedure aimed at finding optima in high dimensional spaces by propagating a set of particles in a sequence of spaces of increasing dimensions until the full parameter space is reached. According to an example embodiment of the invention, a single particle (maximum) may be propagated starting from the small dimensional space of parameters of only one filter and gradually increasing the dimensionality by adding filters or by increasing the filter size. Each time the dimensionality is increased, the position of the particle in the larger Marginal Space may be searched by Coordinate Ascent.

More specifically, and as illustrated in FIG. 5, the Marginal Space Learning procedure may be started with one filter of size 3×3 with all entries 0 except on the first row, $F_1(1,1)$=0.1, $F_1(1,2)$=−0.1. Starting from this initial setting, the PSNR optimization may be run until not much improvement in M(θ) is observed. This is the location of the particle in the first Marginal Space. Then the parameter space may be enlarged by adding another filter with all entries zero and optimizing for 3000 steps, obtaining the particle position in the second space. The process of increasing the Marginal Space continues by adding one filter and retraining was repeated until there are a total of five 3×3 filters. Then the Marginal Space may be enlarged by increasing the filter size to 5×5 by padding zeros on the border of each filter. The new position of the particle (maximum) may be searched through 3000 steps of optimization. The process of enlarging the Marginal Space by adding filters (now of size 5×5) and retraining may be repeated until the number of filters reaches N=13. This number was chosen by observing that no further improvement in PSNR was obtained on the validation set when more than 13 filters were applied; however, according to other embodiments of the invention, the number of filters may be less than 13 depending on the application and on various constraints associated with the computation of the filters, etc.

An example evolution of the PSNR over all the training, starting with one 3×3 filter and ending with thirteen 5×5 filters is plotted in FIG. 5. Training the 5 filters of size 3×3 takes about 7 hours on a dual-core 2.4 Ghz PC while the whole training for the one iteration σ=25 filters may take up to 3 days.

Figure 4:
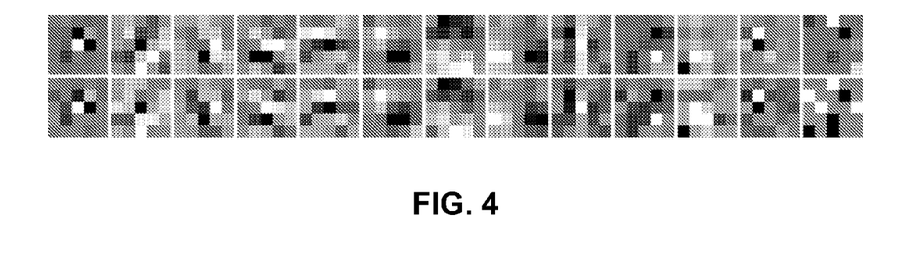
FIG. 4 depicts example Active Random Field (ARF) Filters, according to an example embodiment of the invention.
Figure 6:
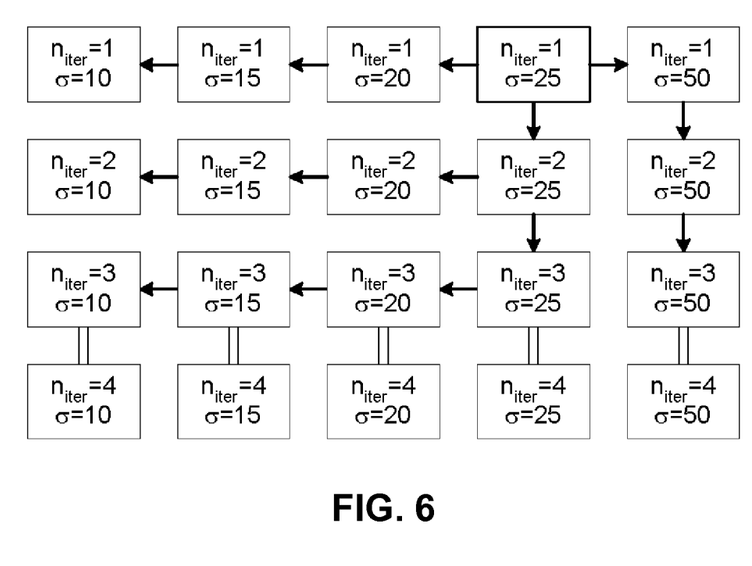
FIG. 6 is an example diagram of the training of the ARF parameters for different levels of noise and numbers of iterations, according to an example embodiment of the invention.

Since the optimization is prone to be stuck in local optima, the other filters may be initialized from already trained filters in the order presented in FIG. 6, according to an example embodiment of the invention. FIG. 6 is an example diagram of the training of the ARF parameters for different levels of noise and numbers of iterations of the steepest descent inference algorithm, according to an example embodiment of the invention. The double lines mean that the filters are the same. The 3-iteration filters are well trained to perform iterative denoising and can also be used for 4-iterations without any modifications. Training each of the arrows in FIG. 6 takes approximately one day on a 8-core 2 Ghz PC, but by using better optimization algorithms, the training time may be further improved. Thirteen trained example 5×5 Active Random Field filters are shown in FIG. 4 The example filters are trained for a level of noise a σ=20 and for one iteration ($n_{iter}=1$, top) and three iterations ($n_{iter}=3$, bottom) using steepest descent inference algorithm. As previously mentioned, images of size 15×15 were initially tested and it was observed that the training PSNR was increasing significantly while the PSNR on the validation set was actually decreasing, a sign of overfitting. Increasing the size of the training images may alleviate the overfilling problem. For example, it was observed that when the training images are at least 250×250, there is no sign of overfitting.

TABLE 1

Performance evaluation and comparison of our method (1-4 iteration ARF) with other methods on some standard benchmark images, σ = 25. The ARF results are obtained 7-3000 times faster.

| | Image | | | | | |
|---|---|---|---|---|---|---|
| | Lena | Barbara | Boats | House | Peppers | Average |
| Fields of Experts | 30.82 | 27.04 | 28.72 | 31.11 | 29.20 | 29.38 |
| 1-iteration ARF | 30.15 | 27.10 | 28.66 | 30.14 | 28.90 | 28.99 |
| 2-iteration ARF | 30.66 | 27.49 | 28.99 | 30.80 | 29.31 | 29.45 |
| 3-iteration ARF | 30.76 | 27.57 | 29.08 | 31.04 | 29.45 | 29.58 |
| 4-iteration ARF | 30.86 | 27.59 | 29.14 | 31.18 | 29.51 | 29.66 |
| Wavelet Denoising | 31.69 | 29.13 | 29.37 | 31.40 | 29.21 | 30.16 |
| Overcomplete DCT | 30.89 | 28.65 | 28.78 | 31.03 | 29.01 | 29.67 |
| Globally Trained Dictionary | 31.20 | 27.57 | 29.17 | 31.82 | 29.84 | 29.92 |
| KSVD | 31.32 | 29.60 | 29.28 | 32.15 | 29.73 | 30.42 |
| BM3D | 32.08 | 30.72 | 29.91 | 32.86 | 30.16 | 31.15 |

Results

The performance of the Active Random Field (ARF) system, according to an embodiment of the invention, was evaluated on the standard images well known in the field of digital image processing, namely: Lena, Barbara, Boats, House and Peppers—at the noise level σ=25. The performance results are shown in Table 1. Note that these images were not used for training. The ARF results are obtained between 7 and 3000 times faster than the other methods.

Figure 7:
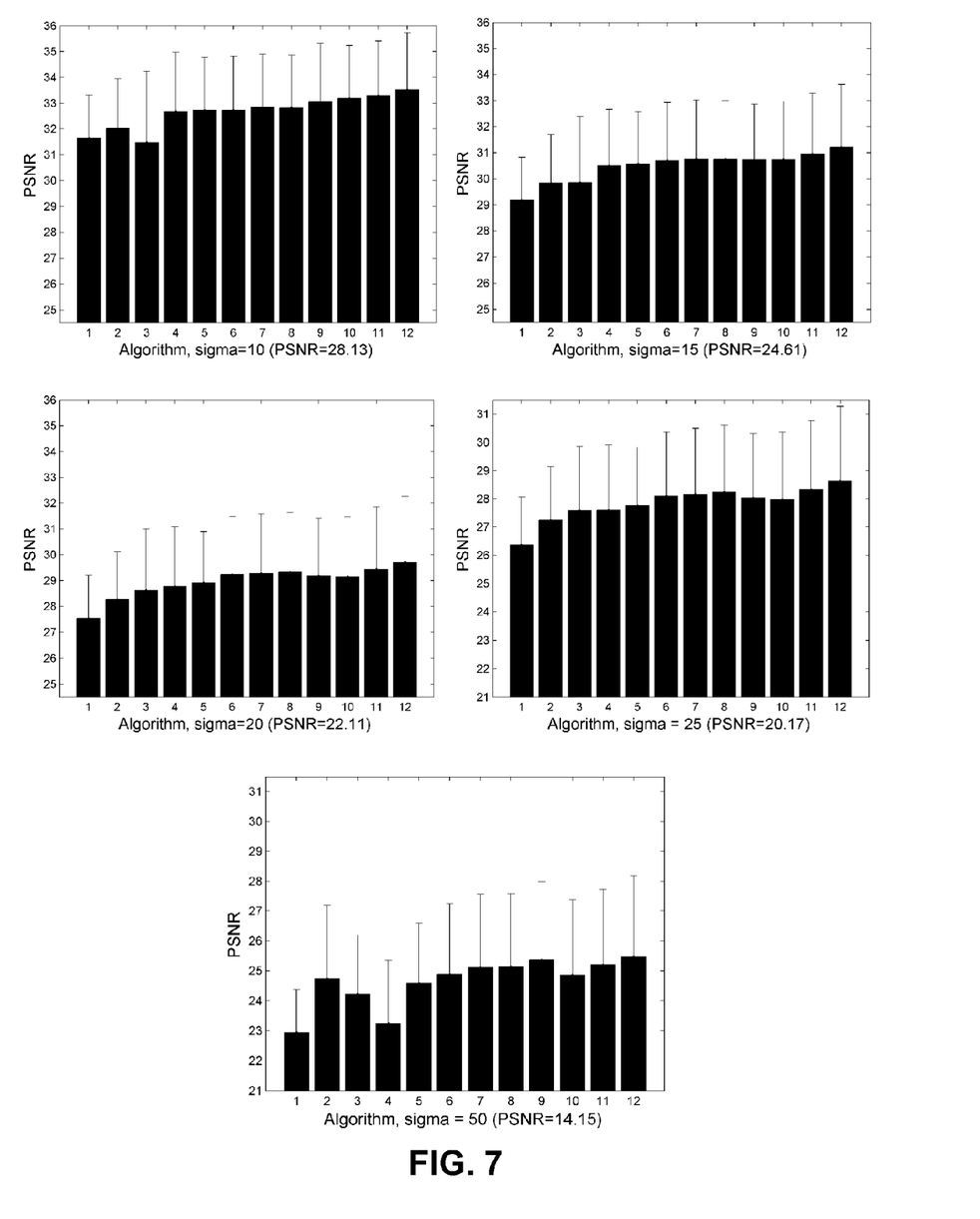
FIG. 7 is an example comparison illustrating different filtering methods.

For further comparison, Table 2 and FIG. 7 present results on the same 68 test images from the Berkeley dataset. Note that these images were also not used for training. Results are presented for (1): Wiener filter, (2) Nonlinear Diffusion using a nonlinear diffusion Matlab toolbox provided by Frederico D'Almeida, with parameters λ=8, σ=1, diffusivity=3, step size=8, steps=2, and with the aos option, (3): Non-local means with search window 17×17, similarity window 9×9 and h tuned for best results for each σ, (4): Fields of Experts (FOE) with 3000 iterations, (5), (6), (7) and (8); our algorithm with 1, 2, 3, 4 iterations, (9); wavelet based denoising, (10): Overcomplete DCT, (11): KSVD and (12): BM3D. Since this evaluation is on 68 images, it should be regarded as a more thorough evaluation than the results on five specific images.

From the evaluation, it is clear that the ARF with one iteration is on par with the FOE, while being 3000 times faster. Therefore, training the MRF model together with a sub-optimal inference algorithm offers significant advantages in speed and accuracy. One could also observe that the ARF is within 0.5 dB from the best method, and it is outperformed by two methods: KSVD, BM3D and for some noise levels by wavelet denoising and overcomplete DCT.

Figure 8:
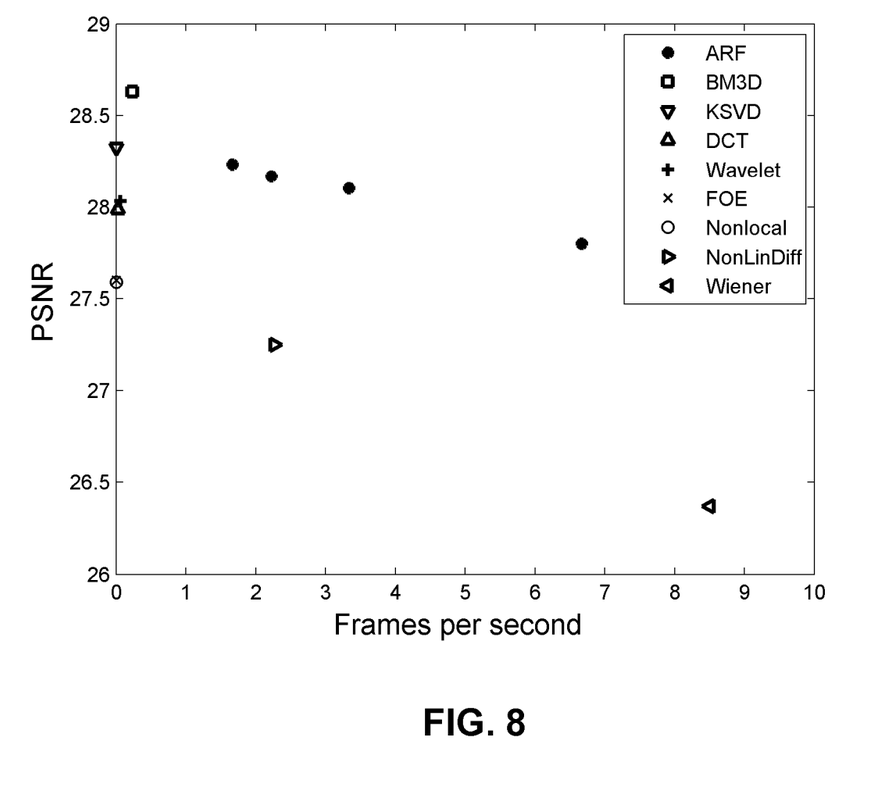
FIG. 8 is another example comparison illustrating different filtering methods.

Depending on application, trade-offs between speed and accuracy might be important. FIG. 8 shows a comparison plot of PSNR (dB) vs speed (fps) of different denoising algorithms on the 68 Berkeley test images for σ=25. Algorithms used are the same as shown in FIG. 6. From this figure, one can see that the Active Random Fields are very competitive candidates when high processing speeds are required such as in real-time imaging applications, for example, in medical applications such as X-ray imaging, MRI imaging, and similar applications.

TABLE 2

Performance evaluation of different denoising methods on 68 images from the Berkeley dataset. Average PSNR of the denoising results obtained by the methods at different noise levels.

| | Level of Noise σ | | | | |
|---|---|---|---|---|---|
| | 10 | 15 | 20 | 25 | 50 |
| 1. Wiener Filter | 31.65 | 29.18 | 27.53 | 26.37 | 22.94 |
| 2. Nonlinear Diffusion | 32.03 | 29.83 | 28.28 | 27.25 | 24.73 |
| 3. Non-local | 31.48 | 29.86 | 28.62 | 27.59 | 24.22 |
| 4. Fields of Experts | 32.68 | 30.50 | 28.78 | 27.60 | 23.25 |
| 5. 1-iteration ARF | 32.74 | 30.57 | 28.92 | 27.77 | 24.58 |
| 6. 2-iteration ARF | 32.74 | 30.70 | 29.23 | 28.10 | 24.88 |
| 7. 3-iteration ARF | 32.84 | 30.76 | 29.29 | 28.17 | 25.11 |
| 8. 4-iteration ARF | 32.82 | 30.76 | 29.33 | 28.24 | 25.14 |
| 9. Wavelet Denoising | 33.05 | 30.73 | 29.18 | 28.03 | 25.37 |
| 10. Overcomplete DCT | 33.19 | 30.75 | 29.15 | 27.98 | 24.86 |
| 11. KSVD | 33.30 | 30.96 | 29.43 | 28.33 | 25.20 |
| 12. BM3D | 33.53 | 31.21 | 29.71 | 28.63 | 25.47 |

The computation complexity of the ARF image denoising algorithm is due to the necessity of performing 2N convolutions (where N is the number of filters) for each iteration. A standard Matlab implementation takes about 0.8 s for each iteration on a 256×256 image and a 2.4 GHz PC. A better C++ implementation using IPL (Intel Image Processing Library) brings the computation time down to 0.12 s per iteration for the same image size. In addition, a parallel implementation on multiple CPUs could further bring this algorithm to real-time performance.

One-Iteration Algorithms

Figure 9:
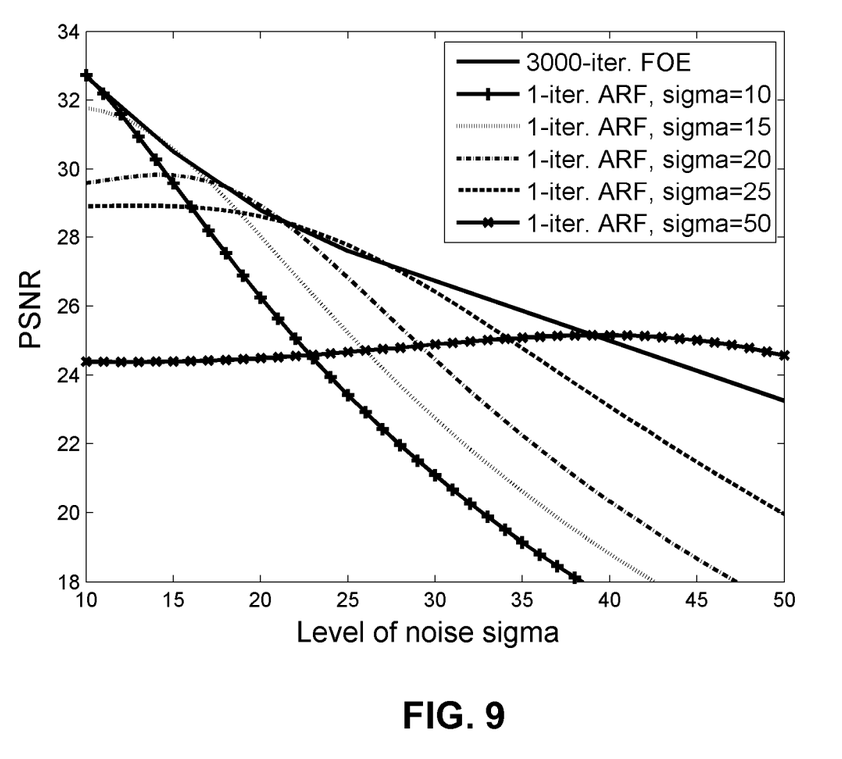
FIG. 9 is an example comparison illustrating one-iteration denoising filters.

Experiments were performed to better understand why the single gradient descent iteration produced such surprisingly good results, and to determine if the result contributions were due to the specially trained filters $F_j$ or to the filter coefficients $\alpha_j$. FIG. 9 shows the PSNR (dB) performance of the 1-iteration ARF with σ in the range from 10 to 50, according to example embodiments of the invention, on the 68 Berkeley test images. The 3000 iteration Field of Experts (FOE) algorithm is also included for comparison. For comparison, the FOE performance is also displayed. It is clear from this figure that the ARF algorithms are specialized at the levels of noise they were trained for.

Figure 10:
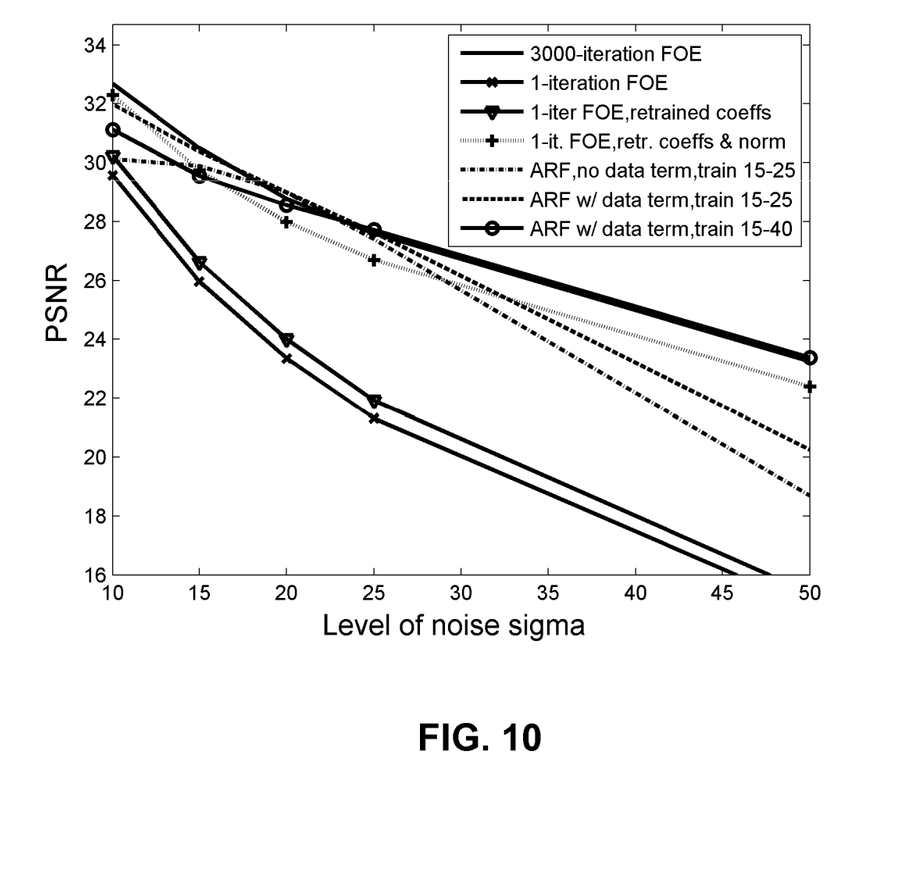
FIG. 10 is an example comparison illustrating one-iteration denoising filters at different noise levels.

The FOE model was then evaluated with a single iteration gradient descent algorithm on the same 68 images from the Berkeley dataset, choosing the step size δ to maximize the PSNR. The results are presented in the second row in Table 3 below, and in FIG. 10. FIG. 10 shows example PSNR (dB) curves of different 1-iteration denoising algorithms, according to example embodiments of the invention, at different noise levels on the 68 Berkeley test images. The 3000 iteration FOE algorithm is also included for comparison.

Another 1-iteration FOE mode) was obtained by retraining the coefficients $\alpha_j$ for each σ to maximize the PSNR on the training data, while keeping the original filters $F_j$. These results are posted in the third row in Table 3 and in FIG. 10. The number of parameters that are trained for each noise level a (for each algorithm) are also displayed in Table 3

The fourth row of Table 3 indicates an evaluation of the FOE filters when the filter norms $v_j$(i.e. scalar multipliers $F_j = v_j F_j^{FOE}$) and their coefficients $\alpha_j$ were trained for each value of σ by maximizing the PSNR on the training set.

TABLE 3

Testing errors on 68 unseen Berkeley images when training different 1-iteration ARF algorithms.

| Algorithm | #of σ-dependent parameters | 10 | 15 | 20 | 25 | 50 |
|---|---|---|---|---|---|---|
| FOE | 1 | 32.68 | 30.50 | 28.78 | 27.60 | 23.25 |
| 1-iteration FOE | 1 | 29.57 | 25.96 | 23.35 | 21.31 | 14.92 |
| 1-iter. FOE, retrained coeffs | 24 | 30.23 | 26.63 | 24.00 | 21.92 | 15.39 |
| 1-iter. FOE, retrained coeffs & norms | 48 | 32.29 | 29.73 | 27.99 | 26.69 | 22.39 |
| ARF, no data term | 0 | 30.13 | 29.89 | 28.99 | 27.40 | 18.69 |
| ARF w/data term, trained with σ ∈ [15, 25] | 1 | 31.99 | 30.37 | 28.99 | 27.63 | 20.26 |
| ARF w/data term, train with σ ∈ [15, 40] | 1 | 31.13 | 29.55 | 28.56 | 27.72 | 23.38 |

The fifth row in Table 3 presents the performance of a 1-iteration ARF that was trained on images corrupted with noise levels σ=15 and 25 and no data term. Observe that the performance decreased slightly while the noise range was extended.

In the 1-iteration ARF, the data term has theoretically no influence, since before the iteration x−y=0. The 1-iteration ARF was slightly modified to a 2-step version that bears the same computational expense but can take into account the data term:

$$1.\ x \leftarrow y + \delta \sum_{f=1}^{N} \alpha_f J_f^- * \frac{J_f^T y}{1 + \frac{1}{2}(J_f^T y)^2} \quad (15)$$

$$2.\ x \leftarrow x + \delta \frac{\beta_\sigma}{2\sigma^2}(x - y)$$

where the data term has a coefficient $\beta_\sigma$ that depends on σ. This can be also written in a single iteration as $$x \leftarrow y + \delta \sum_{f=1}^{N} \alpha_f \left(1 + \frac{\beta_\sigma}{2\sigma^2}\right) J_f^- * \frac{J_f^T y}{1 + \frac{1}{2}(J_f^T y)^2} \quad (16)$$

The last two rows of Table 3 and in FIG. 10 show results obtained with this modified 1-iteration ARF The first one is trained with images corrupted with noise levels σ=15 and 25, while the second one with images corrupted with noise levels σ=15 and 40, One can see that the band-pass behavior disappeared after the introduction of the data term.

The FOE with the coefficients and norms retrained at each noise level (fourth row in Table 3) has a very good overall performance. However, compared to the ARF algorithms displayed in Table 3, it has 48 times more parameters (24 norms and 24 coefficients) that are trained at each noise level.

Applied to image denoising, experiments show that considerable gains in speed and accuracy are obtained applying the invention, when compared to the standard MRF formulation. Moreover, the obtained results are comparable in terms of accuracy with the state of the art while being faster.

Example practical applications of the invention include denoising digital images associated with a digital still camera or a digital video camera. According to an example embodiment of the invention, many pairs of noisy and clean images may be obtained with the digital (or video) camera sensor using normal and long exposure times. Then the filters may be trained using these pairs. The filters may be then used in the digital or video camera for fast denoising. The particular filters used for denoising a particular image may be selected based the amount of light that the sensor received, exposure time, and other camera settings including focus, aperture, shutter speed and zoom. For example, and according to additional embodiments of the invention, the camera designer or manufacturer could utilize test images taken under a plurality of camera settings and/or lighting conditions to create a library of noisy images, and associated optimum (or relatively, noise-free) images. The library could be utilized to calculate a filter set for each of the plurality of camera settings and/or lighting conditions. Since the generation of the filter set may be computationally intensive, the filter generation could be done using generalized test images prior to shipping the camera, and the generated (pre-defined) filter set library could be loaded within the memory and/or special denoising processors of cameras during the manufacturing process. Alternatively, updated or special purpose filter sets may be provided directly to consumers or to camera shops for loading into the camera memory via a firmware upgrade. According to an example embodiment of the invention, after a digital image has been captured, the denoising processor may select the appropriate filter set from memory, based on detected camera settings and/or lighting conditions, and the denoising processor may apply the selected filter set to image to rapidly remove the noise. This same general denoising process could also be applied to denoising digital images on a personal computer, or over a network, such as the internet.

Similarly, example practical applications of the invention could include removing noise from X-ray images and/or sequences, where pairs of noisy (low radiation) and clean (high radiation) may be obtained from live subjects or cadavers. The filter bank may be chosen based on the X-ray beam parameters including voltage and/or current.

Another example practical application of the invention could include removing noise from ultrasound images, where pairs of noisy (low radiation) and clean (high radiation) may be acquired from CT images of live subjects or cadavers, and synthetic ultrasound images may be obtained from the CT images. The pairs of noisy (synthetic ultrasound images) and clean (synthetic ultrasound without added noise) may be generated and the system may be trained, according to example embodiment of the invention. The invention could also be used in other applications where fast MRF inference is desired on models with a large number of parameters, for example in super-resolution images.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. A method for generating one or more denoising filters comprising:
    receiving, by a device comprising at least one processor, at least one pair of training images, wherein the at least one pair of training images comprises a noisy and a clean training digital image;
    training, by the device, a denoising algorithm and associated Active Random Field model to determine denoising filters, wherein the training comprises:
        applying, by the device, the denoising algorithm to the at least one pair of training images, wherein the denoising algorithm comprises at least one current denoising filter;
        changing, by the device, at least one element in the at least one current denoising filter to produce one or more subsequent denoising filters based at least in part on a loss function, the loss function maximized by an optimization method;
        applying, by the device, the one or more subsequent denoising filters to the at least one pair of training images starting with one iteration and adding filters and iterations; and
        terminating, by the device, training upon reaching a predetermined metric of improvement; and
    storing, by the device, the denoising filters in a memory device.

2. The method of claim 1, wherein storing the denoising filters comprises storing, by the device, one or more image capture settings associated with the pair of training images.

3. The method of claim 1, wherein the Active Random Field comprises one of a Markov Random Field or a Conditional Random Field.

4. The method of claim 1, wherein the loss function comprises determining, by the device, the average peak signal to noise ratio over images in a set.

5. The method of claim 1, wherein the optimization method comprises a selection, by the device, from the group consisting of: coordinate ascent algorithm, gradient ascent algorithm, conjugate gradient method and simplex method.

6. The method of claim 1, wherein training the denoising algorithm and associated Active Random Field model comprises simultaneously training, by the device, the denoising algorithm, and the associated model.

7. A system comprising:
    a memory device comprising software instructions;
    a communications interface configured to receive digital images;
    a processor, in communication with the memory device and the communications interface, that executes the software instructions to train a denoising algorithm and associated Active Random Field model to generate denoising filters, wherein the training comprises:
        receiving at least one pair of training images, wherein the at least one pair of training images comprises a noisy and a clean training digital image;
        applying the denoising algorithm to the at least one pair of training images, wherein the denoising algorithm comprises at least one current denoising filter;
        changing at least one element in the at least one current denoising filter to produce one or more subsequent denoising filters based at least in part on a loss function, the loss function maximized by an optimization method;
        applying, the one or more subsequent denoising filters to the at least one pair of training images starting with one iteration and adding filters and iterations; and
        terminating training upon predetermined metrics of improvement.

8. The system of claim 7, wherein the Active Random Field comprises one of a Markov Random Field or a Conditional Random Field.

9. The system of claim 7, wherein the loss function comprises determining the average peak signal to noise ratio over images in a set.

10. The system of claim 7, wherein the optimization method comprises a selection from the group consisting of: coordinate ascent algorithm, gradient ascent algorithm, conjugate gradient method and simplex method.

11. The system of claim 7, wherein the subsequent denoising filters are stored in the memory device.

12. The system of claim 7, wherein the communications interface may comprise a communications link with a digital camera.

13. The system of claim 7, wherein the communications interface may comprise a communications link with the internet.

14. A camera, comprising:
    a memory device comprising software instructions;
    a communications interface configured to receive digital images;
    a processor, in communication with the memory device and the communications interface, that executes the software instructions to:
        select, based at least on parameters associated with a digital image of the digital images, a set of denoising filters from one or more generated denoising filter sets, wherein the one or more generated denoising filter sets is based at least in part on a loss function, wherein the loss function is maximized by an optimization method; and apply the selected set of denoising filters to the digital image; wherein the one or more generated denoising filter sets were determined by training a denoising algorithm and an associated Active Random Field model.

15. The camera of claim 14, wherein the training the denoising algorithm comprises:

applying the denoising algorithm to at least one pair of training images, wherein the at least one pair of training images comprises a noisy and a clean training digital image and wherein the denoising algorithm comprises at least one current denoising filter;

changing at least one element in the at least one current denoising filter to produce one or more subsequent denoising filters, wherein the at least one current denoising filter is based at least in part on a loss function, the loss function maximized by an optimization method;

applying the one or more subsequent denoising filters to the at least one pair of training images starting with one iteration and adding filters and iterations; and terminating training upon predetermined metrics of improvement.

16. The camera of claim 14, wherein the parameters associated with the digital image comprise a selection from the group consisting of: aperture settings, focus settings, shutter speed settings, and lighting conditions.

17. The camera of claim 14, wherein the Active Random Field comprises one of a Markov Random Field or a Conditional Random Field.

18. The camera of claim 14, wherein the loss function comprises determining the average peak signal to noise ratio over images in a set.

19. The camera of claim 14, wherein the optimization method comprises a selection from the group consisting of: coordinate ascent algorithm, gradient ascent algorithm, conjugate gradient method and simplex method.

20. The camera of claim 14, wherein the communications interface comprises a Charge Coupled Device (CCD) array.

* * * * *